(12) United States Patent
Beeken et al.

(10) Patent No.: US 10,083,088 B1
(45) Date of Patent: *Sep. 25, 2018

(54) MANAGING BACKUP COPIES IN CASCADED DATA VOLUMES

(71) Applicant: International Business Machines Corporation, Armonk, NY (US)

(72) Inventors: Christopher Beeken, Eastleigh (GB); Joanna K. Brown, Winchester (GB); Carlos F. Fuente, Bishops Waltham (GB); Denis Alexander Frank, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,407

(22) Filed: Dec. 12, 2017

Related U.S. Application Data

(63) Continuation of application No. 15/649,975, filed on Jul. 14, 2017.

(51) Int. Cl.
*G06F 3/06* (2006.01)
*G06F 11/14* (2006.01)

(52) U.S. Cl.
CPC .......... *G06F 11/1448* (2013.01); *G06F 3/065* (2013.01); *G06F 11/1458* (2013.01); *G06F 11/1451* (2013.01); *G06F 11/1464* (2013.01)

(58) Field of Classification Search
None
See application file for complete search history.

(56) References Cited

U.S. PATENT DOCUMENTS

| 8,051,259 | B2 | 11/2011 | Agombar et al. |
| 8,793,453 | B2 | 7/2014 | Agombar et al. |
| 8,990,529 | B2 | 3/2015 | Agombar et al. |
| 2004/0181639 | A1* | 9/2004 | Jarvis .................. G06F 11/2069 711/161 |

(Continued)

FOREIGN PATENT DOCUMENTS

CN   101140536 A   3/2008

OTHER PUBLICATIONS

Unknown, "FlashCopy mappings", printed Dec. 31, 2016, 5 pages.
(Continued)

*Primary Examiner* — Midys Rojas
*Assistant Examiner* — Khoa D Doan
(74) *Attorney, Agent, or Firm* — Nicholas D. Bowman

(57) ABSTRACT

Point-in-time backup copies of a production volume that include volume maps between adjacent source and target volumes can be created in a cascade of data volumes. An empty volume map having the backup copy as the target can be created. The empty volume map can include a first bitmap used to indicate that data is stored in the source or the target, a second bitmap for use in managing and optimizing background copying, and an index for tracking a status of background copying. The volume map can be populated so that the first bitmap indicates data is stored in the source, and the index set to a start value. Production volume data regions can be sequentially background copied to the backup copy, while tracking using the index. Upon backup copy completion, the values of the volume map having the backup copy as the target can be stored.

1 Claim, 7 Drawing Sheets

(56) References Cited

U.S. PATENT DOCUMENTS

| | | | |
|---|---|---|---|
| 2004/0260735 A1* | 12/2004 | Martinez | G06F 3/0613 |
| 2006/0080503 A1* | 4/2006 | Araki | G06F 3/0613 |
| | | | 711/113 |
| 2009/0037418 A1* | 2/2009 | Xu | G06F 11/1435 |
| 2009/0106332 A1 | 4/2009 | Agombar et al. | |
| 2011/0296127 A1* | 12/2011 | Agombar | G06F 11/1448 |
| | | | 711/162 |
| 2013/0346711 A1 | 12/2013 | Beeken et al. | |
| 2013/0346712 A1* | 12/2013 | Agombar | G06F 11/1458 |
| | | | 711/162 |
| 2014/0189233 A1 | 7/2014 | Agombar et al. | |
| 2015/0286423 A1* | 10/2015 | Akirav | G06F 3/0619 |
| | | | 711/103 |
| 2017/0102881 A1 | 4/2017 | Beeken et al. | |

OTHER PUBLICATIONS

IBM, "IBM Flex System V7000 Storage Node", IBM Knowledge Center, printed Jun. 13, 2017, 3 pages.
Beeken et al., "Managing Backup Copies in Cascaded Data Volumes", U.S. Appl. No. 15/649,975, filed Jul. 14, 2017.
IBM, List of IBM Patents or Patent Applications Treated as Related, Dec. 11, 2017, 2 pages.

* cited by examiner

MANAGING BACKUP COPIES IN CASCADED DATA VOLUMES

BACKGROUND

The present disclosure relates to data storage and more specifically to managing backup copies of data in cascaded volumes in data storage systems. Data stored within a computer, server or other electronic system can be volatile, and therefore subject to loss due to causes including, but not limited to, hard drive failures, power system failures and malware such as trojans and viruses. The loss of electronically stored data may result in downtime of an electronic system such as a computer or server, and the time required to restore/recover lost data may result in loss of system availability and/or revenues generated through the use of the system. In certain cases, if data is not backed up, the regeneration of data may take an unacceptably long time, and in certain cases lost data may be irretrievable.

A process of backing up electronically stored data can include the copying and archiving of data stored on a computer or other electronic system so it may be restored to the system after a data loss event. Current backup copies of electronic data may facilitate recovery of the data in a timely fashion, and may also ensure that the data is not irretrievably lost. In certain applications, data backups may be regularly scheduled and/or automated, and may be supplemented by manually initiated backups. Manually initiated backups may be useful, for example, during or after the completion of a significant amount of data entry or other manual tasks performed on a computer system, or after execution of a batch process. To ensure the safety and security of backed-up data, the media used to contain the data, such as a hard disk drive or magnetic tape, may be stored in an "off-site" location that is physically secure and remote from the electronic system.

SUMMARY

Embodiments may be directed towards a computer-implemented method. The method creates a "point-in-time" backup copy of a production data volume in a cascade of data volumes. The cascade of data volumes includes copies of the production data volume and volume maps between adjacent source and target data volumes in the cascade. The method creates an empty volume map having the backup copy as the target volume. The empty volume map includes a first bitmap including a plurality of bitmap values each corresponding to a data region and indicating whether the data for the data region is stored in the source data volume or the target data volume. The empty volume map also includes a second bitmap including a plurality of bitmap values each corresponding to a data region and for use in optimizing background copying of the production data volume to the backup copy. The empty volume map also includes an index for tracking a status of background copying of the production data volume to the backup copy. The method populates the volume map by populating the first bitmap with bitmap values indicating that the data for each data region is stored in the source data region. The method also populates the volume map by populating the second bitmap with bitmap values in an opposite or complimentary state to the bitmap values of the first bitmap, and setting the index to a start value. The method background copies the data regions of the production data volume at the point in time sequentially to the backup copy, while tracking the background copying using the index. The method copies individual data regions of the production data volume to the backup copy, prior to host writes of data to the data regions of the production data volume after the point in time, while tracking the location of the data for the data regions using the first bitmap. When creation of the backup copy is complete the method stores the values of the volume map having backup copy as the target volume, prior to the backup copy becoming independent of the cascade.

Embodiments may also be directed towards a system. The system comprises a storage system including a storage controller and data storage for storing data volumes. The storage controller includes a memory unit and a processing unit. The processing unit is configured to maintain, in the data storage, a cascade of data volumes including copies of a production data volume and volume maps between adjacent source and target data volumes in the cascade. Each volume map includes a first bitmap including a plurality of bitmap values each corresponding to a data region, each bitmap value of the first bitmap indicating whether the data for the data region is stored in the source data volume or the target data volume. The processing unit is configured to create a backup copy of the production data volume in the cascade of data volumes at a point in time. The processing unit is configured to create an empty volume map having the backup copy as the target volume. The empty volume map includes a first bitmap including a plurality of bitmap values each corresponding to a data region and indicating whether the data for the data region is stored in the source data volume or the target data volume. The empty volume map also includes a second bitmap including a plurality of bitmap values each corresponding to a data region and for use in optimizing background copying of the production data volume to the backup copy. The empty volume map also includes an index for tracking a status of background copying of the production data volume to the backup copy. The processing unit is further configured to populate the volume map by populating the first bitmap with bitmap values indicating that the data for each data region is stored in the source data region. The processing unit is also configured to populate the volume map by populating the second bitmap with bitmap values in an opposite or complementary state to the bitmap values of the first bitmap, and setting the index to a start value. The processing unit is configured to background copy the data regions of the production data volume at the point in time sequentially to the backup copy, while tracking the background copying using the index. The processing unit is further configured to copy individual data regions of the production data volume to the backup copy, prior to host writes of data to the data regions of the production data volume after the point in time while tracking the location of the data for the data regions using the first bitmap. When creation of the backup copy is complete and prior to the backup copy becoming independent of the cascade, the processing unit is configured to store the values of the volume map having backup copy as the target volume in the data storage.

Embodiments may also be directed towards a computer program product. The computer program product comprises a computer readable storage medium having program instructions embodied therewith. The program instructions are executable by a processor to cause the processor to create a backup copy of a production data volume in a cascade of data volumes at a point in time. The cascade of data volumes includes copies of the production data volume, and volume maps between adjacent source and target data volumes in the cascade. The program instructions are executable by a processor to cause the processor to create an empty volume map having the backup copy as the target volume. The empty volume map includes a first bitmap including a plurality of bitmap values each corresponding to a data region and indicating whether the data for the data region is stored in the source data volume or the target data volume. The empty volume map also includes a second bitmap including a plurality of bitmap values each corresponding to a data region and for use in optimizing background copying of the production data volume to the backup copy. The empty volume map also includes an index for tracking a status of background copying of the production data volume to the backup copy. The program instructions are executable by a processor to cause the processor to populate the volume map by populating the first bitmap with bitmap values indicating that the data for each data region is stored in the source data region. The program instructions also cause the processor to populate the second bitmap with bitmap values in an opposite or complementary state to the bitmap values of the first bitmap, and setting the index to a start value. The program instructions are further executable by a processor to cause the processor to background copy the data regions of the production data volume at the point in time sequentially to the backup copy, while tracking the background copying using the index. The program instructions are executable by a processor to cause the processor to copy individual data regions of the production data volume to the backup copy prior to host writes of data to the data regions of the production data volume after the point in time, while tracking the location of the data for the data regions using the first bitmap. When creation of the backup copy is complete and prior to the backup copy becoming independent of the cascade, the program instructions are executable by a processor to cause the processor to store the values of the volume map having backup copy as the target volume.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
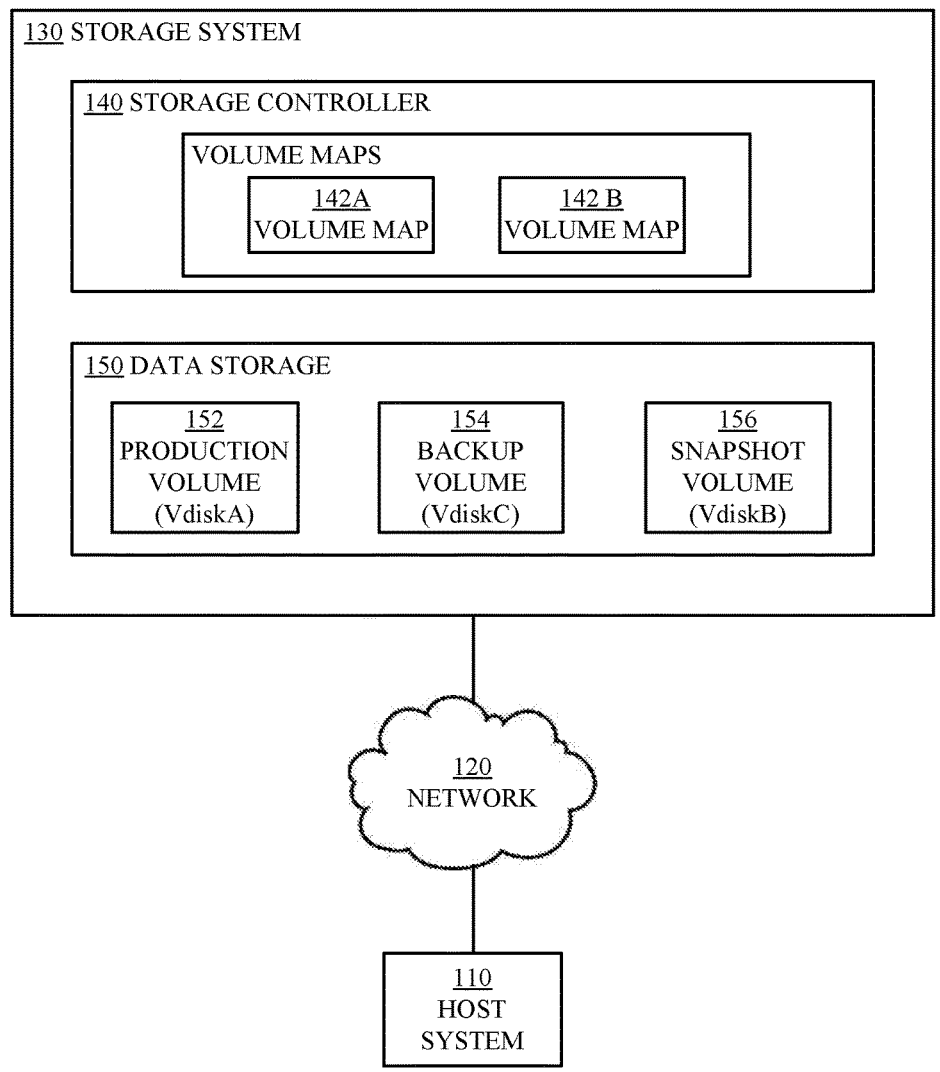
FIG. 1 is a block diagram of a system for managing cascaded data volumes, according to embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, operations, and processes.

DETAILED DESCRIPTION

In storage systems, it is common for copies of data volumes on a storage device such as a hard disk to be maintained on another storage device for backup and related purposes. Such copies of data volumes are important in the case of loss or corruption of data in the storage device, for example, due to hardware malfunction and/or natural disaster.

A storage controller/appliance associated with a storage system can create and maintain copies of data using various methods including "snapshot" and "cloning" techniques. For instance, storage systems can implement the FlashCopy® feature of IBM Corporation of Armonk, N.Y. FlashCopy® is a registered trademark of IBM Corporation in the United States and other countries. The FlashCopy® feature, and equivalent storage system features, can be used to create and maintain copies of data volumes using "volume maps." Volume maps define the mapping relationship between the "source volume," e.g., the data for copying/backup, also referred to as the "primary volume" or "production volume," and the "target volume," i.e., the copy of the data, which may be a snapshot, clone or backup copy.

A snapshot copy of a data volume is a "point-in-time" copy of a source volume that is dependent on the source. A snapshot copy can be generally created without a "background copy" process which involves copying the data from the source volume to the target volume. For example, a snapshot copy may be created by a copy-on-write (COW) process in which a region of data in the source volume is copied to the target volume immediately prior to the data region being overwritten in the source volume, e.g., by a host write. Thus the snapshot copy merely stores data that is changed or overwritten in the source volume after the point in time. As a result, the target volume is often thinly provisioned, which can save back-end storage space. Snapshot copies are generally used for recovery of the source volume at the point in time in the event of data corruption. In practice there are often many concurrently existing snapshot copies of a single source volume, each copy corresponding to different point in time. Thus, minimizing the storage space requirement can be an important feature.

A clone copy of a data volume can be understood to be a point-in-time copy of a source volume that is intended to be independent of the source and remain independent for its lifetime. A clone copy can be created by means of a background copy process, in which the source volume is copied in its entirety at the point in time to the target volume. The background copy process generally involves sequentially copying consecutive regions of the source volume. This copying may take a considerable amount of time, during which the target volume is dependent on the source volume. Clone copies are generally used when a copy is needed and input and output (IO) to the copy must not impact the IO to the source volume in any way. A clone copy can also be used when it is important that the copy is not affected by the availability of the source.

A backup copy can be understood to be a point-in-time copy of a source that is intended to be independent of the source. It is similar to the clone but the point-in-time copy can be refreshed, i.e., the point in time can be changed to a later time. Thus, a backup copy can be initially created by means of a background copy process, during which the target volume is dependent on the source. Thereafter, the background copy becomes independent of the source until a next refresh. While a backup copy is being refreshed, it becomes dependent on the source again. It can be therefore desirable to minimize the refresh time, and thus limit the time that the target volume is dependent on the source volume. Minimizing the refresh time can be achieved if the refresh process only recopies the data that has changed in the source volume since the preceding refresh.

Storage systems having storage controllers/appliances including the FlashCopy® feature, or equivalent, may use a cascading implementation to optimize source volume performance. In particular, a goal of cascading implementations can be to reduce the amount of data copied to target volumes by means of thinly provisioned targets, as opposed to fully allocated targets, in which the entire data volume is copied from the source volume to the target volume. However, source volume performance may be optimized at the expense of target volume dependencies. In particular, a target volume may not include all the data from the source volume, and so may be dependent upon another volume in the cascade in order to replicate the source volume. The target dependencies can cause serious difficulties for the user when the cascade includes a mix of thinly provisioned and fully allocated target volumes, i.e., a mix of snapshot and clone/backup copies.

The cascading approach can work as follows. An existing FlashCopy® implementation, or equivalent, can have a production volume including data to be copied, e.g., for backup, as its source volume, and a FlashCopy® volume, e.g., snapshot or clone copy, as its target volume. When a new FlashCopy® is started in this cascade, the existing FlashCopy® mapping is modified to use the target volume of the new FlashCopy® as its source volume, i.e., instead of the production volume. For example, suppose a production or source volume "P" has a backup FlashCopy® of P on a volume "B1." Thus, there is a chain or cascade P→B1, where P is the source and B1 is the target in the cascade. In this case, P is also referred to as the "effective source" of the P→B1 map. Now suppose a new backup FlashCopy® of P onto volume "B2" is created. In this case, the cascade becomes P→B2→B1. So now map P→B1 has effective source volume B2. This transformation is valid because B2 is an exact copy of P at the relevant point in time.

An "upstream" volume in a cascade can be understood to be a volume that is towards the primary or production volume using a subject volume as a reference, and a "downstream" volume is one that is away from the primary or production volume using the subject volume as a reference. Thus, in the above example, B2 is a volume that is upstream of B1 in the cascade P→B2→B1.

In the cascading approach, the basic IO COW processes must be modified to ensure point-in-time data integrity is maintained during read and write operations. For example, in the case of the above example cascade of volumes P, B1 and B2:

Read IO changes:
 1. Read B1: If data held on B1 read B1, else if data on B2 read B2, else read P
 2. Read B2: If data on B2 read B2, else read P
 3. Read P: Read P Write IO Changes:
 1. Write to B1: Write to B1
 2. Write to B2: If B1 needs data held on P then read P, write result to B1 then write to B2 Else if B1 needs data held on B2 then read B2 and write result to B1 then write to B2 Else Write to B2
 3. Write to P: If B2 needs data held on P then read P, write result to B2 then write to P Else write to P These modifications to the basic IO COW processes enable multiple FlashCopy® map targets, in the example case, B1 and B2, to be cascaded. Cascading is advantageous in that a single write to production volume P can result in at most one extra write to a target volume, irrespective of the number of target volumes from P. Thus, the impact of the FlashCopy® maps on the source/production IO performance is both minimized and bounded. However, a disadvantage of cascading is that it can create a dependency between the target volumes. In the example above B1 is dependent on B2. Accordingly, if B2 needs to be removed from the cascade without losing B1, then all the data on B2 that is needed, i.e., required for host reads, by B1 must first be copied to B1. The process of copying the necessary data from the volume to be removed is referred to as "cleaning." Cleaning can be time consuming and can lead to fully allocated target volumes, negating the advantages of the use of thinly provisioned volumes by increasing the use of target storage resources.

In particular, the target dependency issue associated with cascading described above can be problematic if cleaning is required from a clone or backup volume to a thinly provisioned snapshot volume. An example of this can include a fully-allocated backup copy is to be removed from the cascade while there is a dependent target including a thinly provisioned snapshot copy. In this case, a simple implementation might not discriminate regions of data, referred to as "grains," in the backup copy that have changed because of host write activity, i.e., data no longer in a volume upstream in the cascade, from those that have been copied because the backup copy needs to be independent, i.e., data that is still present in a volume upstream in the cascade. In this case, the implementation would result in all regions of data being copied to the thinly provisioned volume and it becoming fully allocated which could consume valuable storage space.

In a more complex implementation, each region of data can be classified by using metadata. The metadata may be used to determine if the data must be cleaned, i.e., copied to the dependent target prior to removal of the backup copy, or whether the data is still accessible to the dependent target even when the clone or backup copy is removed, e.g., the data can be obtained from a volume upstream in the cascade. In particular, one approach for implementing FlashCopy® maps in a cascaded environment can use two separate bitmaps. A first bitmap, referred to as the "Split" or "S" bitmap, is used to track the data regions stored on the target volume and a second bitmap, referred to as the "Differences" or "D" bitmap, is used to track which data regions stored on the target volume are different from the data stored on the source volume. When implementing this approach with backup copies, the two bitmaps may also be used to determine which data regions have changed on the source volume since the backup copy was last refreshed and only those data regions are recopied during the refresh. However, a disadvantage of the classification of data regions, such as the above two bitmap approach, is that it can introduce complex additional processing and associated metadata in the mapping between the source volume and the target volume.

In another approach, a first bitmap is used as a write copy indicator and a second bitmap is used as a background copy indicator. The first bitmap is used to track the data regions stored on the target volume and the second bitmap is used to track whether a data region has received a write due to a background copy process. It is possible to simplify this approach for a background copy process by replacing the second bitmap with a simple index as the background copy indicator. This index, referred to as "high water mark index" or "index H" herein, is a sequential indicator in which the indicator value of the index, herein "h," maps to one of the data regions. Thus, during a background copy process the index may be sequentially incremented as the data regions are background copied to the target volume. In this way, the index value "h" can be used to determine how far a background copy has progressed and thus which data regions have been copied by the background copy process. However, the use of such an index requires the data to be copied to be stored sequentially in the storage space, i.e., in consecutive data regions, such as during a complete background copy process, e.g., to create a clone copy. However, the data regions that need to be recopied during refresh of a backup copy are a result of host writes to the source volume between refreshes, which are randomly distributed throughout the storage space. Thus, the high water mark approach cannot be used during refresh of a backup copy.

Accordingly, the present disclosure is directed towards a new approach for implementing FlashCopy® maps, or equivalent, for backup copies in a cascaded data storage environment. In particular, the new approach uses two bitmaps to optimize both the cleaning process, when the backup copy is to be removed from the cascade, and the refresh process, when the backup copy is reintroduced into a cascade. Generally, a first or "S" bitmap is used to track the data held on the target volume while the refresh is ongoing and a second or "D" bitmap is used to optimize the refresh activity. A high water mark index H is used to track the status of the target volume during refresh or background copy. The S bitmap is also used to track writes to the source and target between refreshes, in a conventional way. Further details of the new approach can be appreciated from the examples described below.

FIG. 1 is a block diagram of a system 100 for managing cascaded data volumes in accordance with implementations of the present disclosure. System 100 includes a host system 110, a network 120 and a storage system 130. Host system 110 may include any external computer system that accesses data in storage system 130, for example by host read and write (IO) operations. Host system 110 may be communicatively coupled to storage system 130 by network 120. Network 120 may include a local area network (LAN), a wide area network (WAN), the Internet or any other suitable network for data communications.

Storage system 130 stores data for host system 110, which may be local or remote from the storage system 130. Storage system 130 includes a storage controller 140 and data storage 150. Data storage 150 may include any suitable form of non-volatile memory for storing data such as hard disk drives, tape drives and the like, which may be co-located or distributed as required. Storage controller 140 manages the data stored in data storage 150. In the example depicted in FIG. 1, data storage 150 includes a production volume VdiskA 152, a backup volume VdiskC 154 of the production volume VdiskA 152, which is refreshed at periodic time intervals, and a snapshot volume VdiskB 156 of the production volume VdiskA 152. The production volume VdiskA 152, backup volume 154 and snapshot volume 156 are managed by storage controller 140 in a cascaded implementation using volume maps 142A and 142B in accordance with the present disclosure, as described below.

One suitable storage controller for managing cascade volumes is the IBM SAN Volume Controller (SVC) available from International Business Machines of Armonk, N.Y. which implements the abovementioned FlashCopy® feature. The backup volume VdiskC 154 is a fully allocated copy of the production volume VdiskA 152 at a particular point in time, which is removed from the cascade, and thus becomes independent of the production volume VdiskA 152, between refreshes. The backup volume VdiskC 154 may be used in the event of data loss in the production volume VdiskA 152, for example due to failure of the corresponding storage device or otherwise. In contrast, the snapshot volume VdiskB 156 is a thinly provisioned copy of the production volume VdiskA 152 at a particular point in time, which remains in the cascade and dependent upon the production volume VdiskA 152. The snapshot volume VdiskB 156 may be used in the event of corruption of data in the production volume VdiskA 152.

Figure 2A:
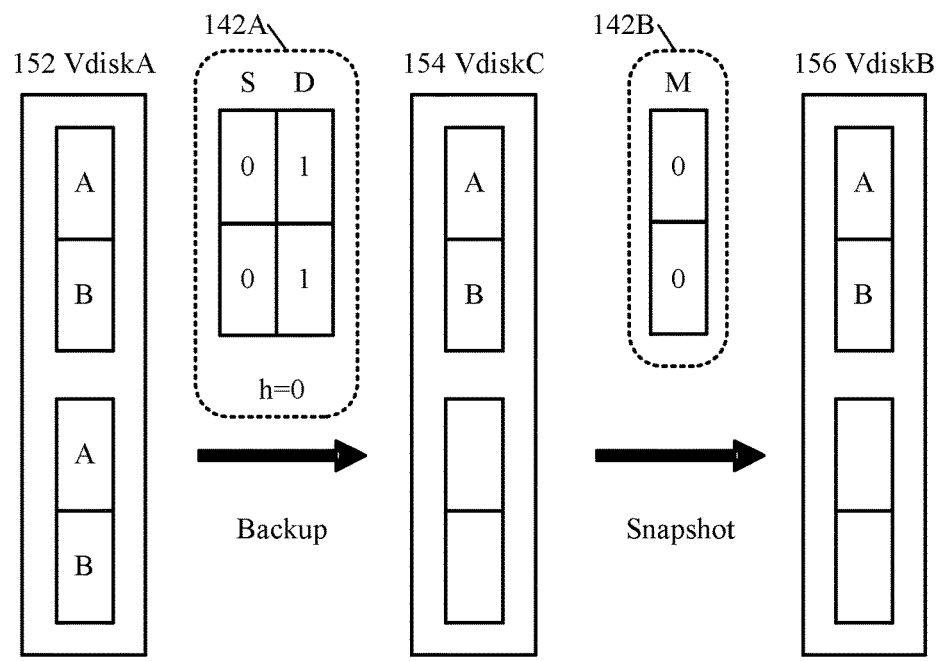
FIG. 2A-2D are schematic diagrams illustrating processing of exemplary volume cascades and corresponding volume maps, according to embodiments consistent with the figures.

FIG. 2A depicts the volume cascade of the above described example, including the backup volume VdiskC 154 and the snapshot volume VdiskB 156 of the production volume VdiskA 152, showing the arrangement at an initial point in time, herein referred to as "T0." In particular, FIG. 2A depicts the three data volumes VdiskA 152, VdiskC 154 and VdiskB 156 in the cascade as blocks with upper and lower portions. An upper portion of each data volume depicts the data regions, known as "grains," that are presented as an image to a user of the host system, and the lower portion depicts whether the data for each grain is actually contained in the respective data volume. A data region storing a grain of data can be understood to be a sector or other addressable portion of a storage volume, e.g., 64 KB in size. For ease of description, in the example depicted in FIG. 2A the production volume VdiskA 152 has two data storage regions for storing a grain of data, i.e., "grain 1" and "grain 2." Any number of data regions can be possible and contemplated by the present disclosure. In FIG. 2A, the upper portion of production volume VdiskA 152 depicts that two grains of data, "A" and "B," are presented to a user and the lower portion depicts that the production volume VdiskA 152 is actually storing those grains, A and B, at time T0. Since the snapshot volume VdiskB 156 and the backup volume VdiskC 154 are created in the cascade as copies of the production volume VdiskA 152 at time T0, each must present to a user the same image as the production volume, VdiskA 152. Thus, the upper portions of both the snapshot volume VdiskB 156 and the backup volume VdiskC 154 show that the two grains of data A and B are presented to a user. However, the lower portions depict that the respective volumes, VdiskB 156 and VdiskC 154, are not storing those grains, A and B, since no background copying of data from the production volume has occurred at time T0.

FIG. 2A also depicts the volume maps for the cascade, including a first incremental map 142A between VdiskA 152 and VdiskB 156 and a second non-incremental map 142B between VdiskB 156 and VdiskC 154. In particular, first incremental map 142A includes a first bitmap S, a second bitmap D and a high water mark index H. Second non-incremental map 142B includes a single bitmap "M". Because the production volume VdiskA 152 includes two data regions for storing grains A and B, each bitmap includes just two bitmap values corresponding to the respective data regions, i.e., grain 1 and grain 2. The first bitmap S of the first incremental map 142A tracks whether each grain presented in the image is actually located on the source volume VdiskA 152 which is indicated by a bitmap value of 0 or the target volume VdiskC 154 which is indicated by a bitmap value of 1. Similarly, the bitmap M of the second non-incremental map 142B tracks whether each grain presented in the image is actually located on the source volume VdiskC 154 which is indicated by a bitmap value of 0 or the target volume VdiskB 156 which is indicated by a bitmap value of 1. In accordance with example implementations of the present disclosure, at the initial point in time, T0, the S and D bitmaps and high water mark index H are populated as follows:

| | |
|---|---|
| Bitmap S-all bits are set as 0 | (indicating all grains are located on VdiskA 152) |
| Bitmap D-all bits are set at 1 | |
| Index H-h is set as 0 | (indicating that background copying has not started) |
| Bitmap M-all bits are set to 0 | (indicating all grains are located on VdiskA 152) |

Accordingly, in the state at time T0, user access requests to VdiskC 154 or VdiskB 156 for grain 1 (A) and/or grain 2 (B) will be redirected to the VdiskA 152, by virtue of the corresponding bitmap values of 0 in bitmap S and bitmap M, respectively.

Figure 2B:
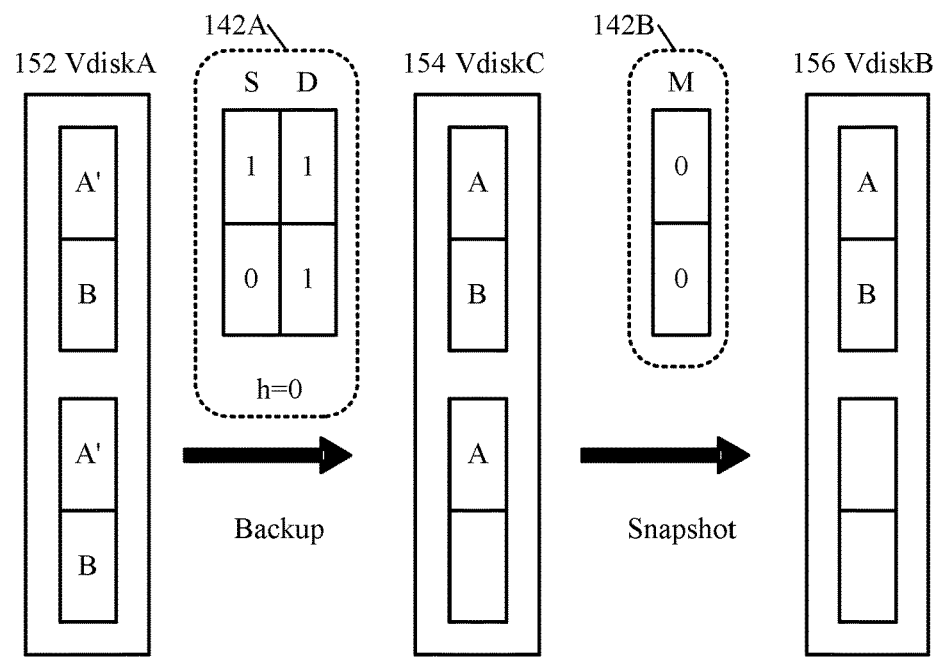

FIG. 2B depicts the volume cascade of the example of FIG. 2A at a point in time subsequent to the initial time T0 of FIG. 2A. At this stage, the background copying of the data, i.e., grains, from the production volume VdiskA 152 to the backup volume VdiskC 154 has not started, and so the value h of high water mark index H remains unchanged (h=0). Instead, FIG. 2B depicts a host write of data A' occurs to grain 1 of VdiskA 152, and, as a result, the abovementioned basic IO COW operations cause a write of data A from VdiskA 152 to VdiskC 154 before grain 1 is overwritten by data A' in VdiskA 152. Thus, as depicted in FIG. 2B, the lower portion of VdiskC 154 now indicates that data A, presented as grain 1 in the image depicted in the upper portion, is actually stored in VdiskC 154. In addition, first bitmap S of the first incremental map 142A is updated to show that the data in grain 1 presented in the image is moved from the source volume VdiskA 152, previously indicated by a bitmap value of 0, to the target volume VdiskC 154 now indicated by a bitmap value of 1. Note that the second bitmap D is not changed by this operation as the D bitmap is used for the refresh activity, as described below. As no changes have occurred between VdiskC 154 and VdiskB 156, second non-incremental map 142B, i.e., bitmap M, remains unchanged.

Figure 2C:
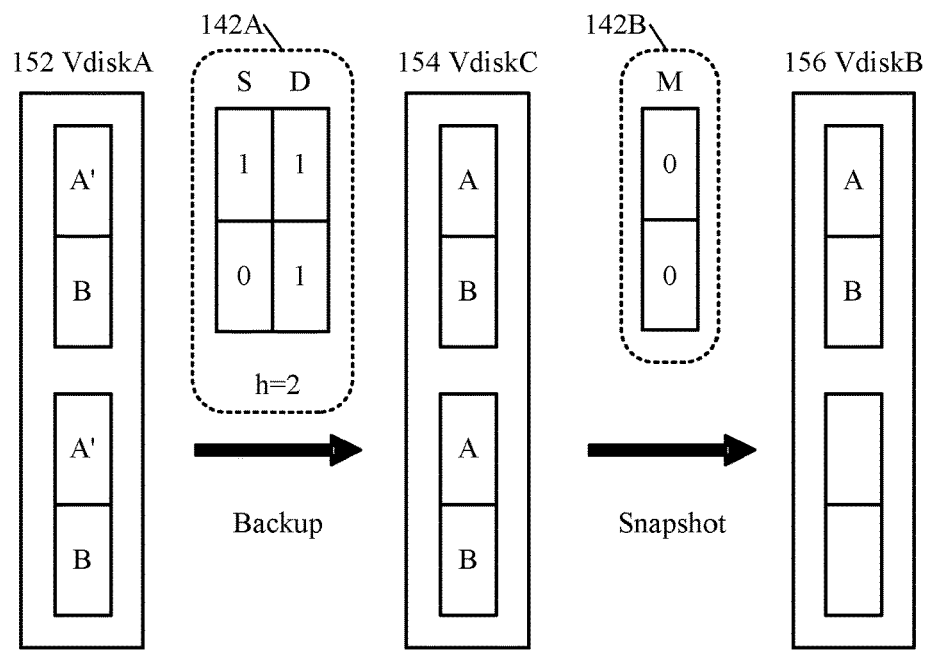

FIG. 2C depicts the volume cascade of the example of FIGS. 2A and 2B, at a point in time subsequent to FIG. 2B. At this stage, the background copying of the data, i.e., grains, from the production volume VdiskA 152 to the backup volume VdiskC 154 has completed, and so the value h of high water mark index H is sequentially incremented to 2 (h=2). In particular, the background copying process considers whether to copy each grain in turn, by first examining the state of the corresponding bitmap value of the S bitmap. If the bitmap value of the grain in the S bitmap is 1, then the grain is already located on the target volume and the index H is incremented without copying the grain, accordingly. Conversely, if the bitmap value of the grain in the S bitmap is 0, then the grain is not located on the target volume and so data may need to be background copied from the source volume to the target volume, after which the index H is incremented. Details of how the background copy process determines whether a grain actually should be background copied during refresh are explained below. Thus, in the example depicted in FIG. 2C, the initial background copy process has merely copied data B from grain 2 of VdiskA 152 to VdiskC 154, since data A from grain 1 is already present in VdiskC 154. Accordingly, the backup volume VdiskC 154 including a fully allocated point-in-time copy of the production volume VdiskA 152 at time T0, i.e., including data A and B, is complete. Backup volume VdiskC 154 is now ready to become independent of the production volume VdiskA 152 by removal from the cascade.

Prior to removal of VdiskC 154 from the cascade, cleaning of data from VdiskC 154 to VdiskB 156 is necessary to ensure snapshot volume VdiskB 156 stores any data from the source VdiskC 154 that cannot be obtained from the upstream production volume VdiskA 152. In particular, the cleaning process considers whether cleaning is necessary for each grain in turn, by first examining the state of the corresponding bitmap value in the second non-incremental bitmap 142B, i.e., bitmap M, and thereafter examining the state of the upstream first incremental bitmap 142A, specifically first bitmap S. In the present example, bitmap M depicts that the data, i.e., grains A and B, in the image of VdiskB 156 presented to the user are not present in VdiskB 156, i.e., each of the two bitmap values of bitmap M is 0, indicating that grains A and B must be obtained from a volume upstream in the cascade. The first bitmap S of the first incremental bitmap 142A depicts that grain 1 is set to 1, indicating that data A located in the target VdiskC 154 and grain 2 is set to 0, indicating that data B is located in the source VdiskA 152. Accordingly, the cleaning process determines that grain A needs to be copied, i.e., "cleaned," to the snapshot volume VdiskB 156 before the backup volume VdiskC 154 can be removed from the cascade, since VdiskB 156 cannot obtain data A from VdiskA 152. The settings of the first incremental bitmap values, S and D, at the time of removal of VdiskC 154 from the cascade are stored in memory, as an historic or previous volume map, for retrieval at the next refresh, as described below. Thus, in the present case, the volume map stored in memory includes: bitmap S=(1, 0), bitmap D=(1, 1) and index h=2, as depicted in FIG. 2C.

Figure 2D:
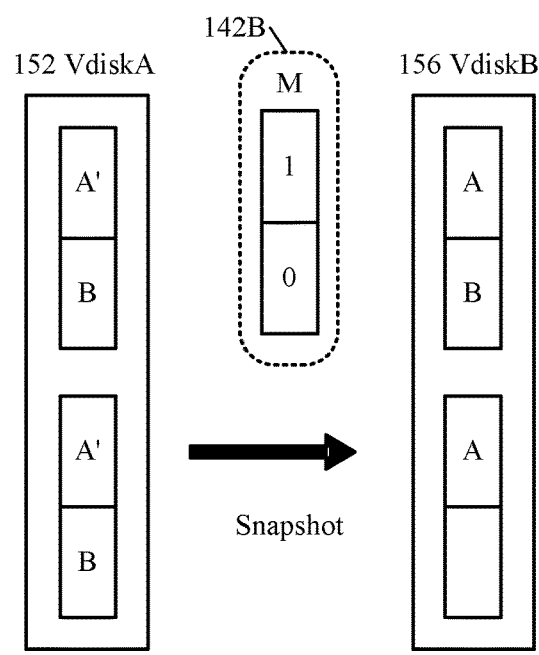

FIG. 2D depicts the volume cascade of the example of FIG. 2A to C, at a point in time subsequent to FIG. 2C. The data A has been copied from the backup volume VdiskC 154 to the snapshot volume VdiskB 156 by cleaning, as described above, and the backup volume VdiskC 154, has been removed from the cascade. In addition, as a result of the cleaning process, bitmap M has been updated to show that data A is actually stored in the target volume VdiskB 156, i.e., for grain 1, the bitmap value is changed from 0 to 1.

Figure 3A:
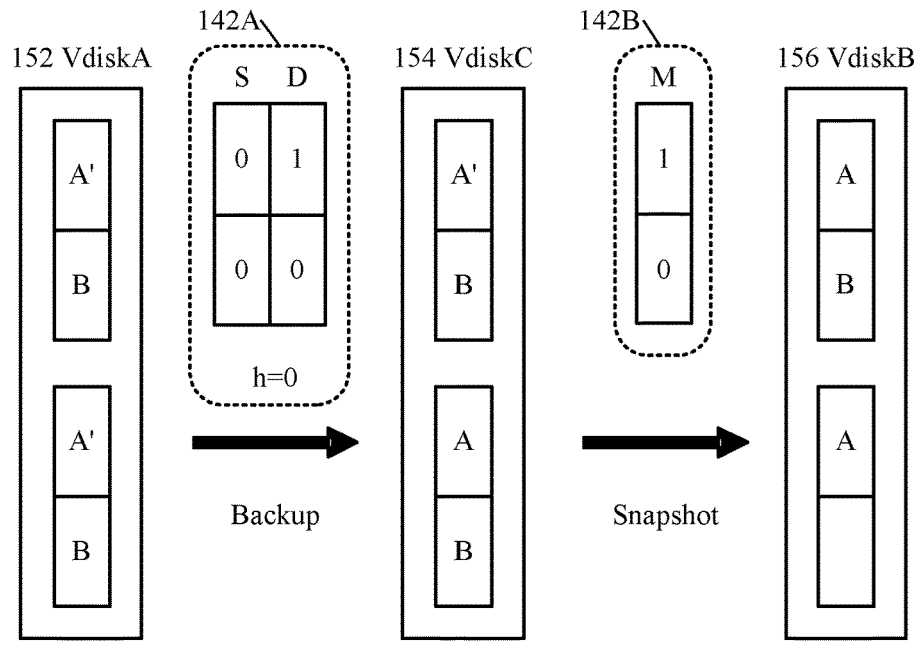
FIGS. 3A and 3B are schematic diagrams, corresponding to FIGS. 2A-2D, illustrating further processing of the exemplary volume cascades and corresponding volume maps, according to embodiments consistent with the figures.

FIG. 3A depicts the volume cascade of the example of FIGS. 2A-2D, when the backup volume VdiskC 154 is reintroduced into the cascade for refresh, at a point in time subsequent to removal from the cascade in FIG. 2D. In particular, the backup copy VdiskC 154 may be reintroduced into the cascade at a refresh time, so that the data can be updated to replicate the data in the production copy at the point in time of the refresh. Refresh of a backup volume can be performed at periodic intervals such as hourly or daily. Thus, for a daily update, the backup volume VdiskC 154 may be reintroduced into the cascade at time T0+(n×24 hours), where n is an integer greater than or equal to 1. Accordingly, as shown in FIG. 3A, the upper portion of the backup volume VdiskC 154 now depicts a new image including the two grains of data, A' and B, to be presented to the user by the refreshed backup volume VdiskC 154, e.g., at time T0+24 hours. This image corresponds to the upper portion of the production volume VdiskA 152 which, in the illustrated example, remains unchanged from FIG. 2D. The lower portion of the backup volume VdiskC 154 depicts the grains of data, A and B, actually stored in the backup volume VdiskC 154 from the previous refresh, i.e., from the initial point in time, T0, shown in FIG. 2A.

A new incremental map 142A between VdiskA 152 and VdiskC 154 is created for the refresh process. In accordance with example implementations of the present disclosure, at the time of refresh, e.g., T0+24 hours, the S and D bitmaps and high water mark index H are populated as follows:

Bitmap S—all bits are set as 0 (indicating all grains are located on VdiskA 152)

Bitmap D—the bits are set using: D'=(D OR NOT H) AND S (using the values of previous bitmaps S, D and index H)

Index H—h is set as 0 (indicating that background copying has not started)

Bitmap M—remains unchanged

Accordingly, the refresh process creates an empty volume map including first and second bitmaps S and D and high water index H. The refresh process then populates the volume map as set out above. In particular the bitmap values for the D bitmap are calculated, for each grain in turn, using the values of the historic volume map from the previous refresh stored in memory, as described above with reference to FIG. 4, i.e., bitmap S=(1, 0), bitmap D=(1, 1) and index h=2).

Now, using the high water mark approach, H for a particular bit, corresponding to a grain, is defined as:

H=1 if h>=bit number
H=0 if h<bit number and so NOT H for a particular bit is defined as:

NOT H=0 if h>=bit number
NOT H=1 if h<bit number

Accordingly, in the present example, h=2, i.e., the previous or initial background copy process from FIG. 2C performed background copy on the two grains, then:

for grain 1: NOT H=0
for grain 2: NOT H=0

Thus, using the previous bitmap values, bitmap S=(1, 0), bitmap D=(1, 1), applying the formula D'=(D OR NOT H) AND S to each grain:

for grain 1: D=(1 OR 0) AND 1=1
for grain 2: D=(1 OR 0) AND 0=0

Accordingly, as depicted in FIG. 3A, the above calculations using the formula D'=(D OR NOT H) AND S determine the new bitmap values (D') as bitmap D=(1, 0) at the start of the refresh process. The other bitmap values are reset, with bitmap S=(0, 0) and high water mark index H, h=0, for the start of the refresh process, as set out above. Bitmap M remains unchanged.

Figure 3B:
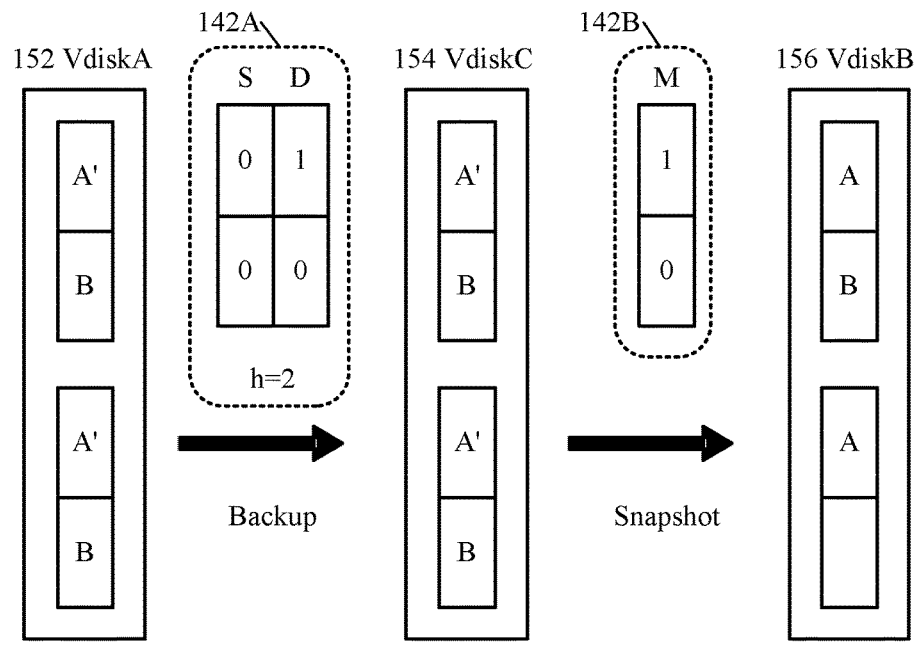

After the above described creation of the new incremental volume map, for reintroducing of backup volume VdiskC 154 as depicted in FIG. 3A, background copying for the purposes of refresh proceeds for each grain in turn dependent on the state of the corresponding bitmap values D and S and high water index H value h. In particular, in accordance with example implementations of the present disclosure, the background copy process is as follows:

background copy grain N if:
the corresponding bit in S is 0, and
the corresponding bit in D is 1, and
the high water mark, H, h<N FIG. 3B depicts the volume cascade of the example of FIGS. 2A to D and 3A, subsequent to completion of the refresh process of backup volume, VdiskC 154. In particular, data A' from grain 1 of source volume VdiskA 152 is background copied to target volume VdiskC 154 since the bitmap value, corresponding bit, for grain 1 of bitmap D=1. However, data B from grain 2 of source volume VdiskA 152 is not background copied to target volume VdiskC 154 since the bitmap value, i.e., corresponding bit, for grain 2 of bitmap D=0. Note that, for both grains 1 and 2, the bitmap value in bitmap S=0 and h<N. The lower portion of the backup volume VdiskC 154 depicts the grains of data, A' and B, corresponding to the upper portion showing image presented by the refreshed backup volume, are now actually stored in the backup volume VdiskC 154 as a result of the refresh. The time duration of the refresh process is minimized by avoiding unnecessarily copying of data B from grain 2.

FIGS. 2A-2D illustrate a process for managing the creation of an independent backup copy in one example data volume cascade, for ensuring data integrity of the cascade by cleaning with improved efficiency. Similarly, FIGS. 3A and 3B illustrate a process for managing the refresh of a backup copy, for optimizing the refresh time with improved efficiency. Other more complex implementations of the processes in accordance with the present disclosure are possible.

In particular, in a more complex example, the backup volume VdiskC 154 may be included in a cascade of five volumes A→E→D→C→B, thus including four bitmaps in between A→E, E→D, D→C and C→B. When removing the backup volume VdiskC 154 and thus the D→C volume map, from the cascade, after copying, i.e., cleaning, to the downstream volume, as in FIG. 2D described above, it is necessary to consider all the upstream bitmaps S for the purposes of saving the bitmap information prior to removal from the cascade. In particular, as described above, the upstream or first bitmaps S are used to record changes to the source volume thereof in each case, in particular, changes to the production volume resulting from host write operations occurring after the relevant point in time, i.e., T0 or refresh time. Such changes may be recorded during the refresh process or at any other time. In the case that such changes have occurred in a grain in the production disk, background copying of the grain should be performed during the refresh process. Accordingly, for this purpose, in example implementations of the present disclosure, the first bitmaps S, or the equivalent non-incremental bitmap, of the upstream bitmaps are combined or merged into the first bitmap to be removed, prior to its storage in memory and subsequent removal from the cascade. Thus, in the present example, the S bitmap values of the bitmaps E→D and A→E are merged into the S bitmap of D→C. In particular, the bitmap value corresponding to each respective grain in the bitmaps are combined together using the OR operation. In this way, the bitmap information indicating a change of a grain in an upstream source volume is preserved. For example, say the four S bitmaps in the cascade each have three grains or bits such that:

bitmap of D→C is (1,0,0)
bitmap of E→D is (0,0,1)
bitmap of A→E is (1,0,1)

Combining the above three upstream bitmaps using the OR operations then forms a new S bitmap D→C as follows:

bitmap D→C is (1,0,1)

Accordingly, in this example, the bitmap values of the combined S bitmap are stored for use during creation of the new volume map at the time of refresh, and, in particular, for use in determining the bitmap values of the second bitmap D thereof, as described above with reference to FIG. 3A.

Figure 4:
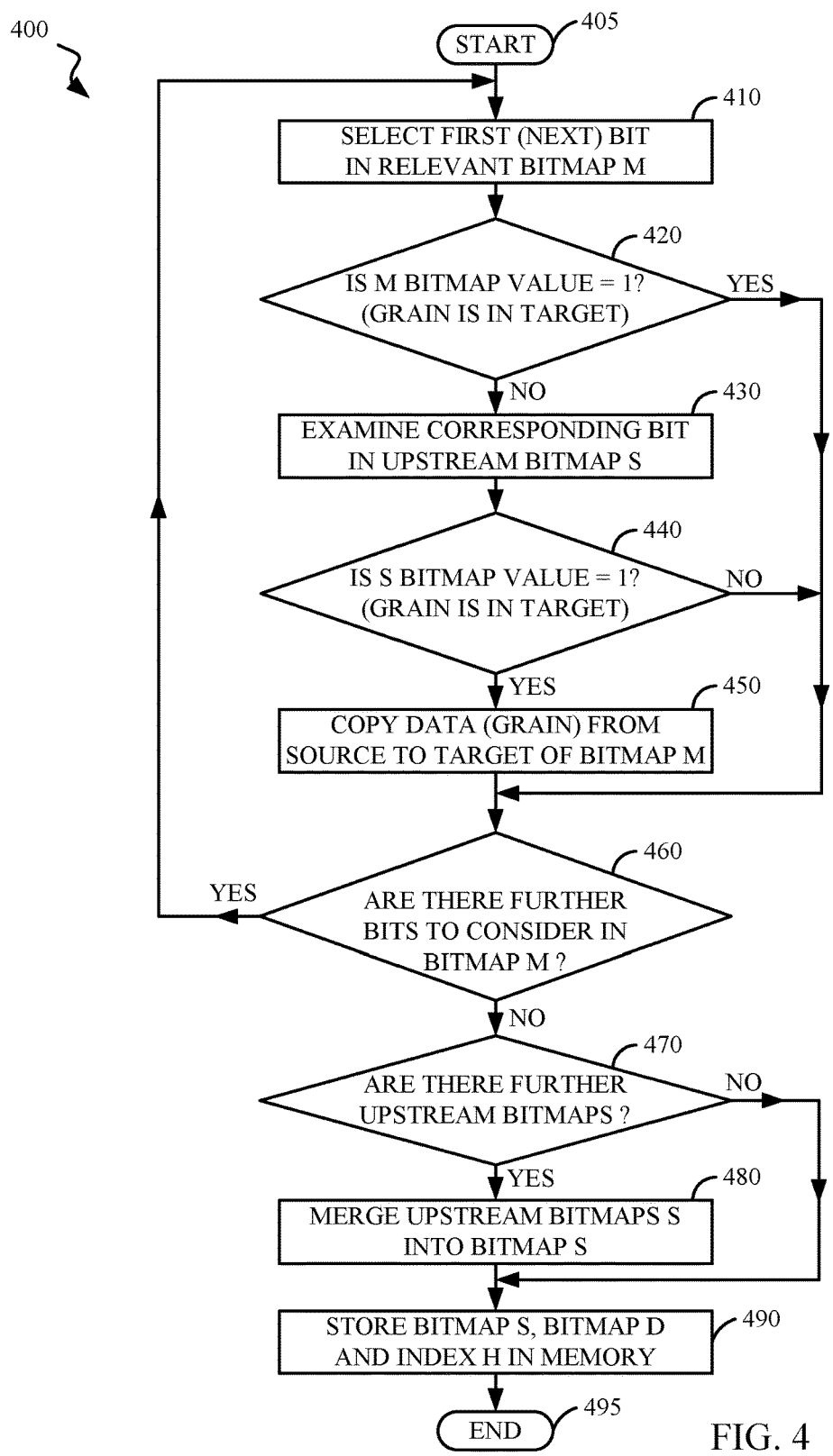
FIG. 4 is a flow diagram of a method for cleaning prior to removing a backup copy from a volume cascade, according to embodiments consistent with the figures.

FIG. 4 is a flowchart of a method 400 for cleaning in accordance with example implementations of the present disclosure. In particular, the method 400 performs cleaning of data from a backup copy to a target volume, prior to removal of the backup copy from a cascade following creation or refresh thereof. The method 400 uses the above described volume map, in accordance with example implementations of the present disclosure. In particular, the volume map includes first and second bitmaps S and D for the data regions, i.e., grains, and a high water index H. The backup copy is the target volume in the volume map.

The method 400 starts at operation 405. For example, the method 400 may start in response to a determination that a backup copy, e.g., VdiskC 154 in FIGS. 2A-2D, is complete and therefore ready to be removed and independent from a cascade. The method 400 considers the bitmaps of the volume maps associated with the backup copy that indicate the location of the corresponding data region, i.e., whether the data is in the source or target. In particular, method 400 first considers the bitmap, herein referred to as the "relevant bitmap," in which the backup copy to be removed is the source volume, e.g., bitmap M in FIGS. 2A-2D, and may then consider the bitmap of the next upstream volume map in the cascade, herein referred to as the "upstream bitmap," in which the backup copy to be removed is the target volume, e.g., bitmap S in FIGS. 2A-2D. In some embodiments, the order of considering the bitmaps may be reversed, e.g., bitmap S may be considered first, and bitmap M may be considered thereafter.

In particular, at operation 410, the method selects the first bit in the relevant bitmap, e.g., bitmap M, which corresponds to the first grain, grain 1, in the target volume. At operation 420, the method determines whether the bitmap value for the selected bit is equal to 1, indicating that grain 1 is present, i.e., stored, in the target volume. If operation 420 determines that the bitmap value is equal to 1, the method continues with operation 460, which determines whether there are further bits to consider in the relevant bitmap, e.g., bitmap M, as described below. However, if operation 420 determines that the bitmap value is not equal to 1, the method continues with operation 430.

At operation 430, the method examines the bit, corresponding to the selected bit, in the first bitmap, e.g., bitmap S, of the upstream volume map, which corresponds to grain 1 in the target volume. At operation 440, the method determines whether the bitmap value for the corresponding bit is equal to 1, indicating that the grain is present in the target volume. If operation 440 determines that the corresponding bit is equal to 1, then the data, i.e., grain 1, is present in the backup copy to the removed and so is not present in the volume upstream of the backup copy in the cascade. Accordingly, the method continues with operation 450 by copying or cleaning the corresponding data, i.e., grain 1, from the backup copy to be removed to the downstream target volume, e.g., from VdiskC 154 to VdiskB 156 in FIGS. 2A-2D. However, if operation 440 determines that the corresponding bit is not equal to 1, then the data, i.e., grain 1, is not present in the backup copy to be removed, but is present in a volume upstream of the backup copy in the cascade. Thus, the downstream target volume is able to obtain the data, i.e., grain 1, from an upstream volume following the removal of the backup copy from the cascade, and cleaning is not required. Accordingly, the method continues with operation 460.

At operation 460, the method determines whether there are further bits to consider in the relevant bitmap, e.g., bitmap M. If operation 460 determines that there are further bits to consider, the method returns to operation 410 which selects the next bit in the relevant bitmap. The method then continues in a loop through operations 410 to 460 until operation 460 determines that there are no further bits to consider in the relevant bitmap. When operation 460 determines that there are no further bits to consider in the relevant bitmap, the method proceeds to operation 470.

At operation 470, the method determines whether there are further upstream bitmaps in the cascade. In particular, operation 470 considers whether there are any bitmaps/ volume maps further upstream of the upstream bitmap examined in operation 430. In some embodiments this is equivalent to determining whether there are more than three volumes in the cascade. If operation 470 determines that there are no further upstream bitmaps in the cascade, then the method proceeds to operation 490, which stores the upstream volume map in memory as described below. However, if operation 470 determines that there are further upstream bitmaps in the cascade, the method proceeds to operation 480.

At operation 480, the method merges the further upstream bitmaps S in the cascade into the upstream bitmap to form an updated, i.e., merged, upstream bitmap, e.g., bitmap S'. The updated upstream bitmap can form part of the volume map in which the backup copy to be removed is the target volume. In example implementations, the further upstream bitmaps S in the cascade are merged with the upstream bitmap S, bit by bit, using the OR operation, as described above. Other techniques for merging the bitmaps, to preserve the upstream bitmap information, are possible and contemplated by the present disclosure. The method then proceeds to operation 490, which stores the updated upstream bitmap, e.g., bitmap S', in memory as part of the historic or previous volume map, including first and second bitmaps S and D and index H. The method then ends at operation 495. The backup copy, e.g., VdiskC 154 in FIG. 2A to D, can be removed from the cascade during or immediately after operation 495.

Figure 5:
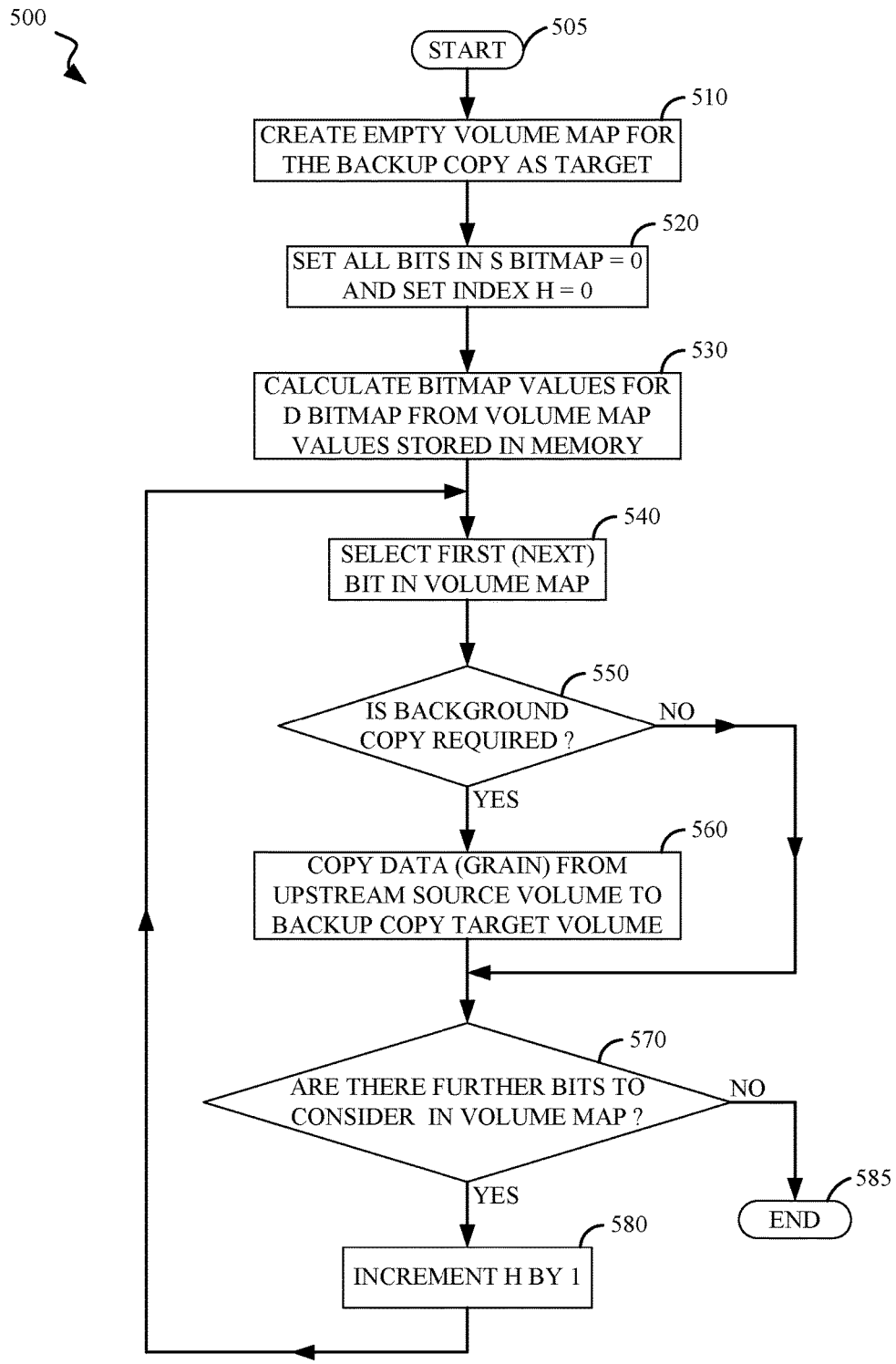
FIG. 5 is a flow diagram of a method for refreshing a backup copy in a volume cascade, according to embodiments consistent with the figures.

FIG. 5 is a flowchart of a method 500 for refreshing a backup copy in accordance with example implementations of the present disclosure. In particular, the method 500 refreshes a backup copy reintroduced into a cascade, following its removal from the cascade to become an independent copy, in particular following the method of FIG. 4. The method 500 uses the volume map in accordance with example implementations of the present disclosure. In particular, a volume map including S and D bitmaps for the data regions, i.e., grains, and high water index H, is created for the reintroduced backup copy as the target volume in the volume map.

The method 500 starts at operation 505. For example, the method 500 may start in response to a determination that a backup copy, e.g., VdiskC 154 in FIGS. 2A-2D, is reintroduced into a cascade, and thus to become dependent thereon, for refresh, i.e., to update the backup copy to a current point in time.

The method 500 first creates a volume map, with the backup copy to be reintroduced into the cascade for refresh as the target volume. In particular, at operation 510 the method creates an empty volume map for the backup copy as the target volume. In particular, operation 510 creates a volume map including first and second bitmaps S and D, with a number of bits corresponding to the number of grains of the target volume, and a high water index H.

At operation 520, the method sets the bitmaps values for all bits in the first bitmap S equal to zero, indicating that the bits are stored in the source volume and sets the value h of the high water index H, equal to zero, indicating that background copying process has not started.

At operation 530, the method calculates the bitmap values for each bit of the second bitmap D, using the values of the historic volume map previously stored in memory, prior to removal of the backup copy from the cascade. For example, the calculation may use the S, D and H values of the volume map stored in operation 490 of the method 400 of FIG. 4 using the formula D'=(D OR NOT H) AND S, as described above in relation to FIG. 3A.

At operation 540, the method selects the first bit, corresponding to the first grain, in the volume map created in operations 510 to 530. At operation 550, the method determines whether background copying the data, i.e., grain, corresponding to the selected bit to the backup copy is required, i.e., meaning that the data has been updated since the last refresh of the backup copy and needs to be recopied. In particular, operation 550 determines whether to background copy the grain to the backup copy based on the S, D and H values of the volume map. The decision whether to recopy the grain may be determined use the S, D and H values of the volume map, as described above in relation to FIG. 3B. For example, for grain N, background copying may be performed when the corresponding bit in bitmap S=0, the corresponding bit in bitmap D=1 and h<N. If operation 550 determines that it is not necessary to recopy the data, the method proceeds to operation 570, as described below. However, if operation 550 determines that the data corresponding to the selected bit should be recopied to the backup copy, the method proceeds to operation 560.

At operation 560, the method background copies the data, i.e., grain, corresponding to the selected bit from the upstream source volume to the backup copy target volume, and then continues to operation 570. At operation 570, the method determines whether there are further bits to consider in the volume map. If operation 570 determines that there are further bits to consider in the volume map, the method proceeds to operation 580 which increments the high water mark index H by one and returns to operation 540. In some embodiments, the order of operations 570 and 580 may be reversed. The method then continues in a loop through operations 540 to 570 until operation 570 determines that there are no further bits to consider in the volume map. When operation 570 determines that there are no further bits to consider in the volume map, the method ends at operation 585.

The use of the volume map, in which a backup copy is the target, in accordance with example implementations of the present disclosure extends the use of a simple index, e.g., high water mark index H, which is incremented during refresh as described above, or an equivalent low water mark index, which is decremented during refresh, to enable simplified tracking of a background copy process for backup copies. In addition, the volume map including first and second bitmaps, S and D, reduces the complexity of the cleaning calculation, prior to removal of the backup copy from the cascade, thereby reducing any adverse impact on IO performance.

Figure 6:
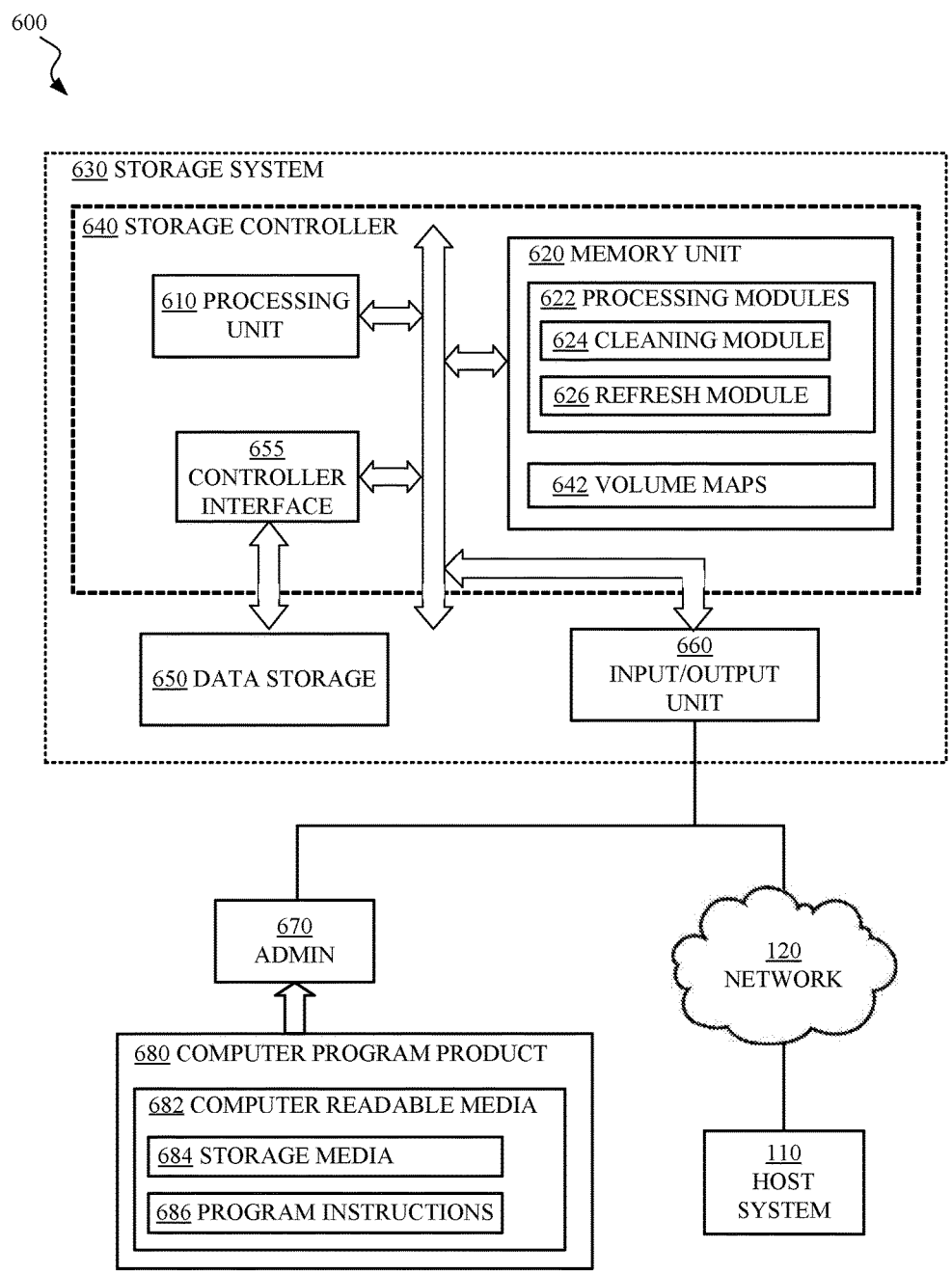
FIG. 6 is a block diagram of a storage system, according to embodiments consistent with the figures.

FIG. 6 is a block diagram of a system 600 for managing cascaded data volumes in accordance with example implementations of the present disclosure. System 600 includes a host system 110 and a storage system 630. As described above with reference to FIG. 1, host system 110 may include any external computer system that accesses data in storage system 630, for example by host IO read and write operations. Host system 110 may be communicatively coupled to storage system 130 by a network 120, which may include a local area network (LAN), a wide area network (WAN), the Internet or any other suitable network for data communications.

Storage system 630 includes storage controller 640, data storage 650 and input/output (I/O) unit 660. I/O unit 660 provides an interface for data communications with external systems such as host system 110 and, optionally, an administrator device 670. Storage controller 640 manages the storage and retrieval of data from data storage 650, which may include at least one component or device for storing data volumes in a cascade, as discussed above. In particular, storage controller 640 includes a processing unit 610, a memory unit 620 and a controller interface 655. Controller interface 655 provides an interface for data communication between storage controller 640 and data storage 650, for the storage, retrieval and management of data in data volumes stored in data storage 650. Memory unit 620 includes processing modules 622 for implementing the functional processes of the storage controller 640. In particular, in accordance with example implementations of the present disclosure, processing modules 622 may be for creating and maintaining cascades of data volumes, including a production volume and at least one copies of the production volume, e.g., snapshot, clone and/or backup copies, in data storage 650. Memory unit 620 further includes volume maps 642 associated with cascades of data volumes, where each volume map defines a mapping between adjacent source and target data volumes in a cascade, as described above.

In accordance with example implementations of the present disclosure as depicted in FIG. 6, processing modules 622 include a cleaning module 624 for managing a cleaning process, including copying data from a backup copy to a downstream data volume in a cascade of data volumes, immediately prior to the backup copy becoming independent of the cascade. In particular, cleaning module 624 may be configured to perform the method 400 described above with reference to FIG. 4. Thus, during operation of cleaning module 624, the volume maps 642 in memory unit 620 may include a volume map 642, e.g., bitmap M, in which the backup copy is the source, and an upstream volume map 642, e.g., bitmaps S, D and index H, in which the backup copy is the target.

In accordance with example implementations of the present disclosure as depicted in FIG. 6, processing modules 622 further include a refresh module 626, for managing a background copying of data to a backup copy during refresh, following the reintroduction of the backup copy into a cascade for the purposes of refresh. In particular, refresh module 626 may be configured to perform the method 500 described above with reference to FIG. 5. Thus, during operation of refresh module 626, the volume maps 642 in memory unit 620 may include a new volume map 642, e.g., bitmaps S, D and index H, in which the backup copy is the target, including bitmaps values, e.g., bitmaps values D, calculated from a corresponding previously stored historic volume map 642.

In example implementations of the present disclosure, a computer program product 680 may be provided, as depicted in FIG. 6. The computer program product 680 may include computer readable media 682 having storage media 684 and program instructions 686, i.e., program code, embodied therewith. The program instructions 686 may be loaded onto memory unit 620 of the storage controller 640 of storage system 630 via I/O unit 660, for example by a user of administrator device 670 or host system 110. The program instructions 686 may include at least one of the above-described processing modules 622, including cleaning module 624 and refresh module 626 of storage controller 640. The program instructions 686 may be executable by the processing unit 610 of storage controller 640 to perform processes for managing data volumes in a cascade of data volumes in data storage 650, in accordance with example implementations of the present disclosure.

The present disclosure encompasses a system, a method, and/or a computer program product at any possible technical detail level of integration. The computer program product may include a non-transitory computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of at least one programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various example implementations of the present disclosure. In this regard, each block in the flowchart or block diagrams may represent a module, segment, or portion of instructions, which includes at least one executable instruction for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
creating, at a point in time, a backup copy of a production data volume in a cascade of data volumes, the cascade of data volumes including copies of the production data volume and a set of volume maps between adjacent source and target data volumes within the cascade of data volumes, the creating including:
creating an initial volume map of the set of volume maps, the initial volume map having the backup copy as a target data volume, the initial volume map including:
a first bitmap including a first plurality of values each corresponding to a first respective data region and indicating whether data for the first respective data region is stored in a source data volume or the target data volume;
a second bitmap including a second plurality of values each corresponding to a second respective data region, the second plurality of values used in managing background copying of the production data volume to the backup copy; and
an index configured for tracking a status of background copying of the production data volume to the backup copy;
populating the initial volume map by:
populating a first plurality of values of the first bitmap with values indicating that data for each first respective data region is stored in the source data volume;
populating the second bitmap; and
setting the index to a start value;
background copying, at the point in time, data regions of the production data volume sequentially to the backup copy while tracking the background copying using the index;
copying, prior to host writes of data to the data regions of the production data volume after the point in time, individual data regions of the production data volume to the backup copy while tracking a location of data for the individual data regions using the first bitmap; and
storing, upon completion of backup copy creation and prior to the backup copy becoming independent of the cascade of data volumes, the values of the initial volume map that have the backup copy as the target data volume;
determining, prior to storing the values of the initial volume map having the backup copy as the target data volume, for each data region in the backup copy, whether to perform cleaning, the cleaning including copying data for a corresponding data region from the backup copy to a data volume immediately downstream of the backup copy in a cascade of data volumes prior to the backup copy becoming independent of the cascade of data volumes, the determining including:
first determining whether a bitmap value corresponding to the data region of the first bitmap of the initial volume map having the backup copy as the source indicates that the data for the data region is stored in the target; and
second determining whether a bitmap value corresponding to the data region of the first bitmap of the initial volume map having the backup copy as the target indicates that the data for the data region is stored in the target;
wherein, if the first determining indicates that the data for the data region is not stored in the target and the second determining indicates that the data for the data region is stored in the target, determining that cleaning should be performed, otherwise determining that cleaning should not be performed;
cleaning, for each of the data regions for which is it determined that cleaning should be performed, the data from the backup copy to the data volume immediately downstream of the backup copy in the cascade of data volumes, while tracking the location of the data for the data regions using a first bitmap in the initial volume map having the backup copy as the source data volume;
determining whether there is at least one further volume map in the cascade of data volumes that is upstream of the initial volume map having the backup copy as the target,
wherein, if the determining indicates that there are further volume maps:
combining respective values of the first bitmap of each of the further volume maps with corresponding values of the first bitmap of the initial volume map having the backup copy as the target; and
updating the initial volume map having the backup copy as the target, so that the first bitmap includes combined values; and
removing the backup copy from the cascade of data volumes.

* * * * *